United States Patent [19]

Beaty

[11] Patent Number: 4,927,302
[45] Date of Patent: May 22, 1990

[54] THREADING DEVICE

[76] Inventor: Robert A. Beaty, Rte. #1 Box 43-6, Jamestown, Tenn. 38556

[21] Appl. No.: 244,107

[22] Filed: Sep. 14, 1988

[51] Int. Cl.⁵ .......................... B23G 1/26; B23G 5/00
[52] U.S. Cl. ...................................... 408/221; 10/1 B; 10/111; 10/123 P
[58] Field of Search .................. 10/111, 120, 123 R, 10/123 P, 123 S, 1 B; 408/215, 216, 219, 221

[56] References Cited

U.S. PATENT DOCUMENTS

| 311,549 | 2/1885 | Wells | 408/215 X |
| 446,915 | 2/1891 | Fletcher | 408/156 |
| 465,622 | 12/1891 | Baird | 10/123 R |
| 1,613,980 | 1/1927 | Boyd | 408/215 X |
| 1,844,419 | 2/1932 | Borden | 408/239 R |
| 1,971,230 | 8/1934 | Nikoloff | 408/215 |
| 2,896,495 | 7/1959 | Crawford | 10/111 X |

FOREIGN PATENT DOCUMENTS

| 178039 | 7/1917 | Canada | 10/123 R |
| 3506943 | 9/1985 | Fed. Rep. of Germany | 10/123 R |
| 286116 | 3/1928 | United Kingdom | 10/123 S |

Primary Examiner—E. Michael Combs
Attorney, Agent, or Firm—Watson, Cole, Grindle & Watson

[57] ABSTRACT

A threading device which can cut a uniform and symmetrical screw thread in the outer surface of a round bar or tube includes a die nut having internal cutting threads and two axial holes and a guide ring which includes two axial roll pins extending away from a rear face thereof and which are capable of extending into the axial holes in the die nut without play to align the axis of the guide ring with the axis of the die nut. The guide ring will act to maintain the axis of the die nut coaxial with the axis of a round bar or tube which extends through the bore of the guide ring and contacts the cutting threads in the die nut. The die nut (together with the guide ring) can be manually rotated to cut a screw thread in a round bar or tube by means of a conventional wrench.

10 Claims, 1 Drawing Sheet

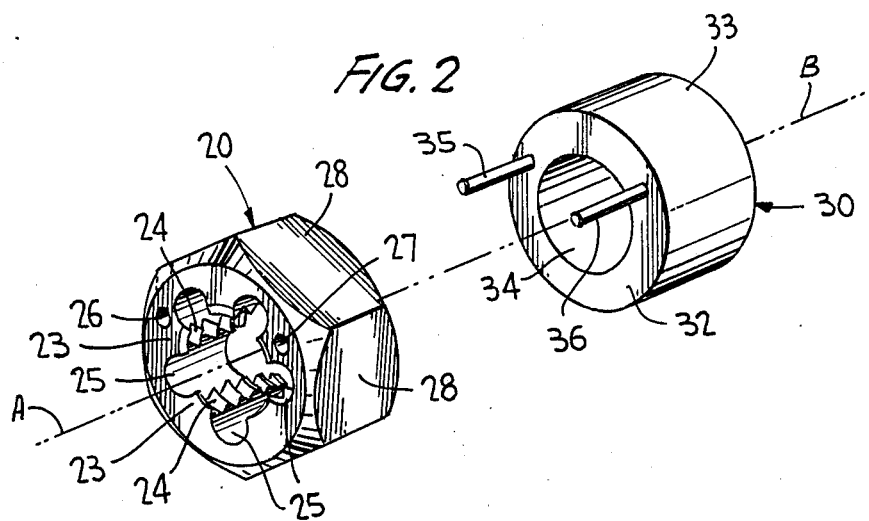
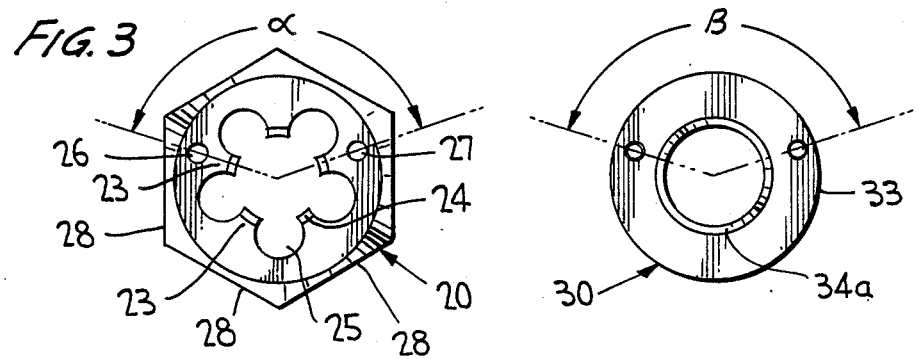
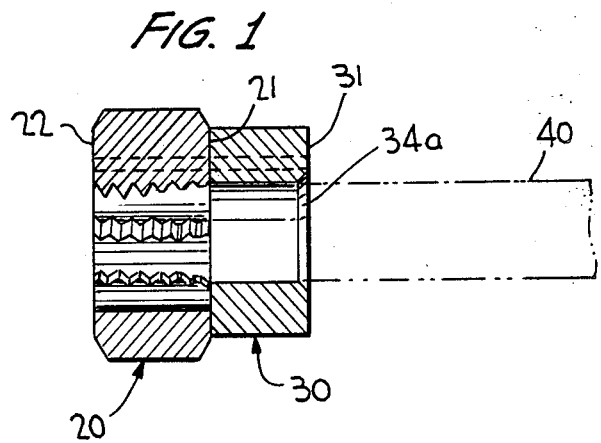

THREADING DEVICE

BACKGROUND OF THE INVENTION

1. FIELD OF THE INVENTION

The present invention relates to devices for cutting screw threads in the outer surfaces of round bars or tubes.

2. THE PRIOR ART

Threading devices for the cutting of screw threads in the outer surfaces of round bars or tubes are well known and normally include a die having internal cutting threads and a die stock in which the die is mounted, the die stock including opposed handles to enable it (and the die mounted therein) to be manually rotated. When the die is positioned against the end of the round bar or tube and rotated by means of the die stock, a screw thread will be cut into the round bar or tube. Many known die stocks are constructed to include guide means to assure that the axis of the die will remain aligned with the axis of the round bar or tube being operated on. However, die stocks that include such guide means are rather complicated in construction and tend to be expensive.

It is an object of the present invention to provide a threading device which is both simple in construction and inexpensive, and which does not require the use of a conventional die stock.

It is also an object of the present invention to provide a guide ring which can be attached to a conventional die to create a threading device that can be rotated around a round bar or tube by a hand wrench and will cut a uniform and symmetrical screw thread therein.

SUMMARY OF THE INVENTION

The threading device according to the present invention includes a die (also termed a die nut) which includes internal cutting threads and a guide ring which is removably attached to the die nut for maintaining the axis of the die nut coaxial with the axis of the round bar or tube being cut, thereby assuring that the screw thread cut into the round bar or tube will be uniform and symmetrical. The die nut, which has a plurality of flat engagement surfaces in its periphery, can be gripped and rotated by a simple hand wrench, thus eliminating the need for a specialized die stock with guide means.

A further understanding of the present invention will be achieved by reference to the attached drawings, taken in conjunction with the following discussion.

BRIEF DESCRIPTION OF THE DRAWINGS

In the drawings,

FIG. 1 shows a cross sectional view through a threading device according to the preferred embodiment of the present invention, the threading device including an interconnected die nut and guide ring, FIG. 2 shows an exploded perspective view of the threading device as shown in FIG. 1, FIG. 3 shows a rear end view of the die nut of the threading device shown in FIG. 1, and FIG. 4 shows a front end view of the guide ring of the threading device shown in FIG. 1.

DETAILED DESCRIPTION OF THE PREFERRED EMBODIMENT

As can be seen in FIGS. 1 and 2, the preferred threading device according to the present invention is composed of two interconnectable elements: a die nut 20 and a guide ring 30. The die nut 20 has a front face 21 and a rear face 22 and is fabricated to include five radially inwardly-extending axial projections 23 which form five respective sets of axially-spaced cutting threads 24 for cutting a screw thread in the outer surface of a round bar or tube 40. The axial projections 23 are equally spaced apart around the axis A of the die nut and the five sets of cutting threads define a gradially decreasing diameter in the direction of the rear face of the die nut, i.e., so that they will cooperate to gradually cut the screw thread into the round bar or tube as the die nut is rotated therearound. Each of the axial projections 23 is separated from an adjacent projection by an axial relief channel 25 which receives the material cut from the round bar or tube by the adjacent set of cutting threads. In addition, the die nut includes two axial holes 26,27 which are located radially outwardly of two generally opposite sets of cutting threads 24 so that they define an angle $\alpha$ of about 144° around axis A. The holes 26,27 enable the guide ring 30 to be connected to the die nut 20. The die nut also includes six identical, flat engagement surfaces 28 around its periphery (i.e., the die nut is a hexagonal die nut). A wrench or similar tool can be positioned around the die nut so as to contact at least two of these engagement surfaces for rotation of the die nut.

The guide ring 30 has a flat front face 31, a flat rear face 32, a cylindrical outer side surface 33 and a cylindrical internal bore (inner side surface) 34. The internal bore 34 is knurled adjacent the front face 31 (see 34' in FIG. 1). The diameter of the peripheral surface 33 is less than the distance between opposite flat engagement surfaces 28 on the die nut 20, and thus will not be contacted by a wrench contacting the die nut 20. The diameter of the internal bore 34 is larger than the diameter formed by the cutting threads 24 nearest the front face 21 of the die nut 20. The guide ring also includes two roll pins 35 and 36 that extend away from its rear face 31 in parallel with its axis B and which are dimensioned so that they can respectively fit within the axial holes 26,27 in the die with virtually no play and are located so that they can simultaneously fit within the axial holes 26,27 and align the axis B of the guide ring 30 with the axis A of the die nut. In other words, they are spaced from axis B the same distance axial holes 26,27 are spaced from axis A and define an angle $\beta$ of about 144° around axis B.

The inventive threading device can be used by simply inserting the end of a round rod or tube 40 into and through the guide ring 30 until it contacts the sets of cutting threads 24 in the die nut 20 and then rotating the die nut and guide ring with a wrench so that the cutting threads 24 of the die nut will cut into the material of the round rod or tube 40 and form a screw thread therein. Because the outer diameter of the round bar or tube being cut will be only slightly less than the diameter of the internal bore 34 in the guide ring, the guide ring 30 will function to maintain the axis A of the die nut coaxial with the axis of the round bar or tube, thereby assuring symmetry and accuracy in the screw thread cut therein. Reversing the rotational direction of the die nut after the desired length of screw thread has been formed in the round bar or tube 40 will enable the threading device to be detached therefrom.

Although a preferred embodiment of the inventive threading device has been shown and described, various modifications therein can be made and still fall within the scope of the appended claims.

I claim:

1. A threading device for cutting threads in the outer surface of a round bar or tube which comprises
    a die nut which defines an axis A and includes a plurality of radially-inwardly extending axial projections, each of said projections providing a set of axially spaced cutting threads thereon, said die nut also including two separated axial holes therein, and
    a guide ring which defines an axis B and a flat front face, a flat rear face, a cylindrical outer side surface which extends from said flat front face to said flat rear face, a cylindrical inner side surface which extends from said flat rear face towards said flat face, and an annular knurled surface which extends from said flat front face to said cylindrical inner surface said guide ring including two roll pins which extend away from said flat rear face in parallel with said axis B and which are extendable into said axial holes in said die nut without play so as to easily detachably connect said guide ring with said die nut and cause said axis B to be coaxial with said axis A, said guide ring assuring proper alignment of a round bar or tube relative to the cutting threads of said die nut and said annular knurled surface thereof helping to guide an entry end of such round bar or tube into and through the guide ring and thereafter into said die nut.

2. A threading device according to claim 1, wherein said die nut includes five of said radially inwardly-extending, axial projections.

3. A threading device according to claim 2, wherein said five radially inwardly-extending axial projections are equally spaced around said axis A.

4. A threading device according to claim 3, wherein said axial holes are located radially outwardly of generally opposite sets of cutting threads such that they define an included angle of about 144°.

5. A threading device according to claim 4, wherein said die nut defines a front face and a rear face, and wherein said five sets of cutting threads define a gradually decreasing cutting diameter in the direction of said rear face.

6. A threading device according to claim 5, wherein said guide ring defines an inner diameter which is generally equal to the cutting diameter formed by said five sets of cutting thread nearest said front face of said die.

7. A threading device according to claim 1, wherein said die nut has six flat engagement surfaces on its periphery.

8. A threading device according to claim 7, wherein said guide ring has an outer diameter which is less than the diameter between opposite flat external engagement surfaces of said die.

9. A guide ring for use with a die nut that defines an axis A and which includes internal cutting threads for cutting a screw thread in the outer surface of a round bar or tube and two axial holes therein, said guide ring defining an axis B and having a flat front face, a flat rear face, a cylindrical outer side surface which extends from said flat front face to said flat rear face, a cylindrical inner side surface which extends from said flat rear face towards said flat front face, an annular knurled surface which extends from said flat front face to said cylindrical inner surface, and two roll pins extending axially away from said flat rear face, said two roll pins being respectively insertable within said two axial holes in said die nut to cause axis B to be aligned with axis A, said annular knurled surface helping to guide an entry end of a round bar or tube into the guide ring for proper alignment with the internal cutting threads of said die nut with which said guide ring used.

10. A guide ring according to claim 9, wherein said two roll pins define an included angle of about 144°.

* * * * *